United States Patent Office 3,785,982
Patented Jan. 15, 1974

3,785,982
LUBRICANTS CONTAINING SUBSTITUTED 2-OXA-ZOLIDONES AS OXIDATION INHIBITORS
Abraham O. M. Okorodudu, West Deptford, N.J., assignor to Mobil Oil Corporation
No Drawing. Continuation-in-part of abandoned application Ser. No. 75,657, Sept. 25, 1970. This application Sept. 27, 1972, Ser. No. 292,587
Int. Cl. C10m 1/20, 1/32
U.S. Cl. 252—51.5 A                 13 Claims

ABSTRACT OF THE DISCLOSURE

Substituted 2-oxazolidones, exemplified by 5-phenyl-5-methyl-2-oxazolidone, are valuable oxidation inhibitors when added to organic materials such as lubricating oils and greases.

CROSS-REFERENCE TO RELATED APPLICATIONS

This application is a continuation-in-part of U.S. application Ser. No. 75,657, filed Sept. 25, 1970, now abandoned.

BACKGROUND OF THE INVENTION

Field of the invention

The invention relates to the inhibition of oxidative deterioration in organic materials. In particular, the invention relates to the inhibition of such oxidation with substituted 2-oxazolidones.

Discussion of the prior art

It is known that many organic compositions are subject to oxidative deterioration under conditions of normal use. These compositions include polymers, both natural and synthetic solids and fluids. As an example of one area in which oxidative deterioration is particularly severe, lubricants used in modern high powered engines are of great interest.

As a result of this oxidation, acidic products are formed which exhibit a corrosive effect on metal parts and produce formations of varnish and sludge on engine surfaces thereby lowering the operating efficiency of the engine. With the development of more powerful engines including free piston and gas turbine engines for trucks and autos as well as gas turbine engines for jet aircraft, the need for lubricating compositions possessing good resistance to oxidation at high temperatures has greatly increased.

There is no known art which discloses or suggests the use of substituted 2-oxazolidones as antioxidants for organic compositions.

SUMMARY OF THE INVENTION

In accordance with the invention, there is provided a lubricating composition comprising a lubricant normally susceptible to oxidative deterioration and an amount sufficient to inhibit said deterioration of a 2-oxazolidone of the formula

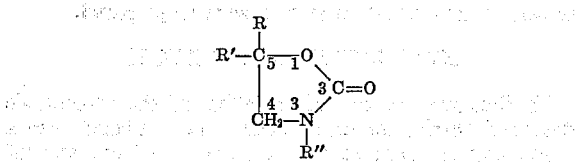

wherein R is selected from the group consisting of (1) alkyl of $C_7$–$C_{20}$, (2) members containing from 1 to about 18 carbon atoms selected from the group consisting of cycloalkyl, aryl, alkaryl and aralkyl and (3) members containing from about 2 to about 25 carbon atoms selected from the group consisting of alkoxyalkyl and aryloxyalkyl, R' is selected from the group consisting of (a) hydrogen, (b) members containing from 1 to about 18 carbon atoms selected from the group consisting of alkyl, cycloalkyl, aryl, alkaryl and aralkyl, and (c) members containing from about 2 to about 25 carbon atoms selected from the group consisting of alkoxyalkyl and aryloxyalkyl and R" is selected from the group consisting of R' and NO.

DESCRIPTION OF SPECIFIC EMBODIMENTS

The compounds wherein R" in the above formula is hydrogen are conveniently prepared by the nitrous oxide treatment of the hydrazide of the product of the Reformatsky reaction of a ketone or aldehyde and ethylbromoacetate, followed by heating. The following summarizes the general steps required in this reaction.

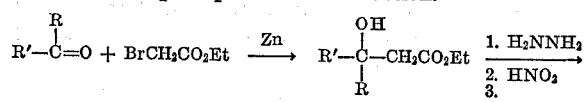

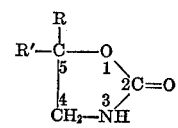

The N(3)-substituted 2-oxazolidones, that is where R" in the above general formula is other than hydrogen or NO, may be generally prepared by reacting an organic isocyanate with an epoxide in the presence of a catalytic amount of lithium chloride, essentially in accordance with the following generalized reaction:

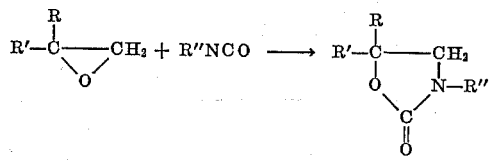

wherein R, R' and R" have the same meaning as above.

The nitroso derivative, that is where R" is the NO group, is made by reacting the 2-oxazolidone with sodium nitrite in the presence of HCl or with nitrosyl chloride, as follows:

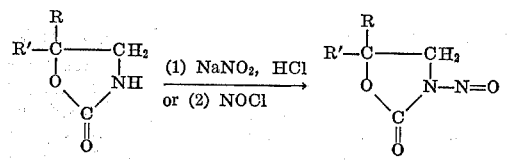

R and R' being as already defined.

More specific procedures for preparing the above compounds may be found in an article by Martin E. Dyen et al. entitled, "2-oxazolidones," in Chem. Rev., 67, pp. 197–246 (1967).

The 2-oxazolidones of this invention may, as has already been mentioned, be employed to improve the oxidation stability at elevated temperatures of a variety of organic compositions of different origins and of varying characteristics, and are effective for this purpose when uesd at concentrations of from about 0.01 to about 10% by weight of the organic composition. They may, for example, be used in natural and synthetic rubbers such as GR–S rubbers, polyurethanes, and the like. They may also be used in a wide variety of lubricants, such as lubricating oils and greases. The lubricating oils include both mineral oils as well as synthetic oils such as synthetic esters, synthetic hydrocarbons and silicones. Mineral oils include oils obtained from different crudes, including naphthenic, paraffinic and mixed base crudes. Synthetic oils include synthetic hydrocarbon polymers, such as polymers from propylene, butylene and the like, alkylene oxide polymers, dicarboxylic acid esters, such as di-(2-ethyl hexyl)

sebacate and di-(2-ethyl hexyl)adipate, liquid esters of phosphorus, polypropylene glycols, esters of pentaerythritol, especially those made from aliphatic monocarboxylic acids having from about 4 to about 20 carbon atoms, particularly from about 5 to about 9 carbon atoms, or mixtures of such acids, neopentyl glycol, polyalkyl silicone polymers and the like. In general, the antioxidants of this invention may be advantageously used in various lubricating compositions such as automotive lubricants, liquid hydrocarbon fuels, marine oils, hydraulic fluids, industrial lubricants and the like, which may require good oxidation resistance at elevated temperatures. The instant antioxidants are particularly suitable for use in gas turbine engines such as jet engines for aircraft and the like. Other organic base media include heat exchange fluids, power transmission fluids, polyolefinic polymers in the form of molded, cast or extruded shapes, or coatings, such as derived from polyethylene, polybutene, polybutadiene and polyvinyl products and the like.

Having described the invention in general terms, the following will specifically illustrate the practice of the invention.

EXAMPLE 1

Preparation of 5-phenyl-5-methyl-2-oxazolidone

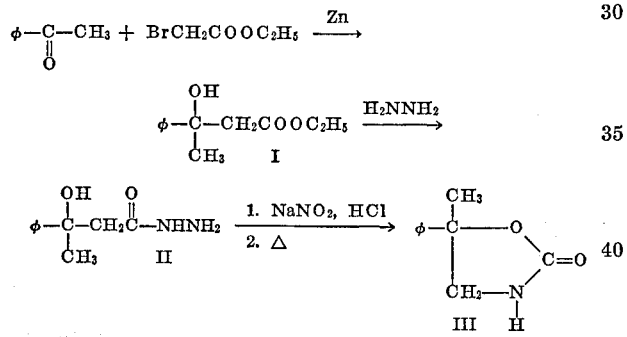

Zinc, 65 g. (1 g. atm.) and 400 ml. of reagent grade benzene were charged into a 1-liter 4-necked flask equipped with a condenser, (carrying a drying tube), mechanical stirrer and an addition funnel. After distilling off 100 ml. of benzene to dry the system, the heat was turned off and a mixture of acetophenone, (90 g., 0.75 mole) and ethylbromoacetate (143 g., 0.85 mole) was added dropwise to maintain the rapid ebuillition. After the addition, the reaction mixture was heated at reflux, with stirring for 35 minutes, cooled and treated with ice cold 2 N HCl. The mixture was extracted with benzene-ether, the organic layer washed with dilute sodium carbonate solution, and then saturated salt solution. After stripping off solvent, distillation afforded 140 g. (90% yield) of the ester I, B.P. 110°/0.5 mm.

The ester I was treated with a 2 molar equivalent of anhydrous hydrazine and a few cc. of ethanol, heated briefly (10 minutes) to reflux and allowed to stand. The solid product II was collected, and washed with petroleum ether. Product II, M.P. 84-85°, yield, 82%. The hydrazide II was dissolved in 2 N HCl and treated at 5-10° C. with a slight excess of NaNO₂ dissolved in water. Benzene was then added to the reaction mixture and while stirring vigorously, it was heated slowly to about 70° C. After the rapid gas evolution subsided, the mixture was allowed to stand overnight. The oxazolidone III which precipitated was collected, washed and dried. Yield, about 80%.

EXAMPLE 2

3-p-tolyl-5-phenyl oxazolidone

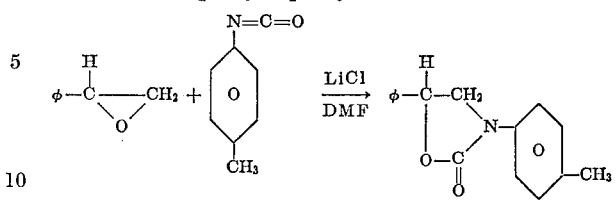

To a stirred mixture of styrene oxide (12 g., 0.1 mole) a catalytic amount of lithium chloride and 40 ml. of DMF (dimethylformamide) dried over molecular sieves at 155° C., under nitrogen, was added a solution of freshly distilled p-tolylisocyanate (13.3 g., 0.1 mole) in 10 ml. of DMF. After addition (25 min.) the reaction mixture was heated at reflux for 6 hours and allowed to stand overnight. The solvent and unreacted material were distilled off at reduced pressure, at below 150° C. The residue was treated with about 80 ml. of hot carbon tetrachloride, filtered and on standing yielded 20.5 g. (81%) of product, M.P. 94-96°.

EXAMPLE 3

Preparation of 3-nitroso-5-phenyl-5-methyl-2-oxazolidone (A) With nitrosyl chloride [for oxazolidones that are insoluble in cold 2 N HCl].

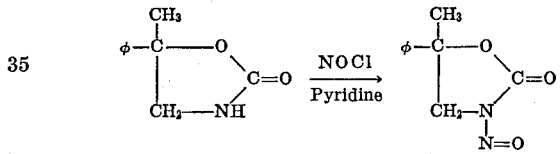

An ice cold solution of nitrosyl chloride (4 g., 0.06 mole) in 10 ml. of acetic anhydride was added dropwise to a stirred solution of 9 g. (0.051 mole) of 5-phenyl-5-methyl-2-oxazolidone in 80 ml. of pyridine (dried over molecular sieves) at 10-15° C. After the addition, the dark red solution was stirred briefly and poured into ice water (about 100 g.). The yellow crystalline product was collected, washed with water, and then dried in vacuo over sulfuric acid. Recrystallization from benzene-petroleum ether gave 9.5 g. (91%) of product, M.P. 117-118°.

(B) With NaNO₂-HCl (for oxazolidones that are soluble in cold 2 N HCl (e.g. item 10, Table 1).

The oxazolidone was dissolved in ice cold 2 N HCl and the solution was treated with a slight excess of sodium nitrite. The nitroso compound separated and was collected, washed and dried and recrystallized if necessary.

Other compounds similarly substituted were prepared by following one of the procedures of the above examples or one substantially the same as those procedures, modified to fit the particular compound. All compounds shown in the evaluation section were so prepared.

EVALUATION OF PRODUCTS

To illustrate the antioxidant effect of the compounds described herein, certain of them were combined with a lubricating oil prepared from pentaerythritol and an acid mixture containing C₅ and C₉ monocarboxylic acids in approximately equal amounts and tested in the following test.

In this test, a catalytic oxidation test for lubricants, the lubricating composition is subjected to a stream of air which is bubbled through the composition at a rate equivalent to 5 liters per hour at 425° F. for 24 hours.

Present in the composition are metals known to be catalysts for oxidation, namely:

(a) sand-blasted iron wire;
(b) polished copper wire;
(c) polished aluminum wire; and
(d) polished lead.

Inhibitors for oil are rated on the basis of their ability to prevent oil deterioration by measuring the increase in acid formation or neutralization number (NN), and kinematic viscosity (KV) occasioned by the oxidation. Following are the results.

TABLE 1

| Item | Additive | Conc., Wt. percent | Final acidity, NN | ΔNN | Viscosity, KV at 100° F. Final | Viscosity, KV at 100° F. Initial | ΔKV, percent |
|---|---|---|---|---|---|---|---|
| 1 | 5-phenyl-5-methyl-2-oxazolidone | 1 | 2.8 | 2.7 | 47.03 | | |
| | | 0.5 | 3.8 | 3.75 | 61.86 | | |
| 2 | 5,5-diphenyl-2-oxazolidone-Ref | Saturated | 5.9 | 5.85 | 115.9 | 26.52 | 338 |
| 3 | 5-(2-ethylpentyl)-2-oxazolidone | 4 | 1.0 | −0.6 | 38.31 | 27.34 | 40 |
| | | 2 | 2.3 | 1.38 | 49.45 | 26.78 | 84 |
| | | 1 | 3.1 | 2.64 | 45.49 | | 69.8 |
| | | 0.5 | 3.3 | 3.1 | 48.45 | | 81 |
| 4 | 3-p-tolyl-5-phenyl-2-oxazolidone | 2 | 3.3 | 3.1 | 47.23 | 26.90 | 75 |
| | | 1 | 3.7 | 3.6 | 56.56 | | 110 |
| 5 | 3-p-tolyl-5-phenoxymethyl-2-oxazolidone | 1 | 6.1 | 6.0 | 79.23 | 26.76 | 191 |
| | | 0.5 | 5.6 | 5.55 | 76.65 | | 185 |
| 6 | 3-phenyl-5-phenoxymethyl-2-oxazolidone | 1 | 5.6 | 5.5 | 81.20 | 26.83 | 201 |
| | | 0.5 | 6.8 | 6.75 | 91.64 | | 240 |
| 7 | 3,5-diphenyl-2-oxazolidone | 2 | 3.8 | 3.7 | 43.81 | 26.76 | 63 |
| | | 1 | 4.2 | 4.15 | 58.74 | | 118 |
| 8 | 3-phenyl-5-decyl-2-oxazolidone | 2 | 5.4 | 5.3 | 66.24 | 26.54 | 150 |
| | | 1 | 4.6 | 4.55 | 65.13 | | 112 |
| 9 | 3-nitroso-5,5-diphenyl-2-oxazolidone | 4 | 5.4 | 4.91 | 53.04 | 27.10 | 95 |
| | | 2 | 4.44 | 4.19 | 60.81 | | 124 |
| | | 1 | 5.16 | 5.03 | 78.69 | | 190 |
| 10 | 1-oxa-3-azaspiro[4,5]decan-2-one | 4 | 2.4 | 2.4 | 57.3 | 28.20 | 102 |
| | | 2 | 3.3 | 3.2 | 53.9 | | 91 |
| | | 1 | 4.6 | 4.6 | 61.9 | | 120 |
| 11 | 3-nitroso-1-oxa-3-azaspiro[4,5]decan-2-one | 4 | 4.70 | 3.99 | 59.30 | 28.43 | 108 |
| | | 2 | 4.34 | 3.98 | 58.38 | | 102 |
| | | 1 | 5.88 | 5.70 | 75.38 | | 164 |
| 12 | 3-nitroso-5-phenyl-5-methyl-2-oxazolidone | 4 | 5.7 | 5.48 | 59.35 | 27.00 | 118 |
| | | 2 | 5.43 | 5.32 | 54.18 | | 100 |
| | | 1 | 4.34 | 4.28 | 53.34 | | 98 |
| 13 | 3-p-tolyl-5-phenyl-2-oxazolidone | 5 | 3.8 | 3.69 | 44.04 | 27.79 | 58 |
| | | 4 | 3.8 | 3.71 | 54.58 | | 96 |
| | | 3 | 4.07 | 4.01 | 48.12 | | 73 |
| 14 | 3-phenyl-5-decyl-2-oxazolidone | 6 | 2.7 | 2.65 | 46.66 | 27.04 | 72 |
| 15 | 3-naphthyl-5-phenoxymethyl-2-oxazolidone | 4 | 3.3 | 2.2 | 50.24 | 28.87 | 73 |
| 16 | 3-nitroso-5-(2-ethylpentyl)-2-oxazolidone | 6 | 7.3 | 3.3 | 76.80 | 26.79 | 186 |
| | | 4 | 7.05 | 4.3 | 70.70 | | 164 |
| | | 2 | 5.43 | 4.1 | 52.59 | | 96 |
| 17 | 3-naphthyl-5-decyl-2-oxazolidone | 6 | 4.5 | 4.39 | 48.89 | 29.4 | 66 |
| | | 4 | 4.86 | 3.79 | 58.71 | | 100 |
| | None | | 8.0 | 7.9 | 142.6 | 26.14 | 447 |

As shown in the above table, the 2-oxazolidones are valuable and effective in their ability to reduce the effects of oxidation on the viscosity in most cases, and on acid values. Further, as is apparent from Table 2, when they are combined with from about 0.05 to about 2.0% by weight of the total composition of phenyl-naphthylamine, especially phenyl-α-naphthylamine, or of dioctyl diphenylamine, the acid number is even more effectively reduced and in many cases so is the increase in viscosity. The results shown in Table 2 were obtained in the same catalytic oxidation test described above. The same lubricant was used.

TABLE 2

| Item | Additive | Acidity, NN Final | Acidity, NN Initial | ΔNN | Viscosity, KV at 100° F. Final | Viscosity, KV at 100° F. Initial | ΔKV, percent |
|---|---|---|---|---|---|---|---|
| 1 | 1% 5-phenyl-5-methyl-2-oxazolidone plus 1% Van 81* | 1.5 | 0.1 | 1.4 | 34.25 | 27.51 | 24.4 |
| 2 | 0.5% 5,5-diphenyl-2-oxazolidone plus 1% Van 81 | 3.5 | 0.08 | 3.42 | 42.01 | 27.65 | 51.5 |
| 3 | 1% 5-(2-ethylpentyl)-2-oxazolidone plus 1% Van 81 | 1.3 | 0.40 | 0.90 | 33.95 | 27.38 | 23.5 |
| 4 | 1% 3-p-tolyl-5-phenyl-2 plus 1% Van 81 | 3.3 | 0.1 | 3.2 | 42.35 | 27.48 | 54 |
| 5 | 1% 3-p-tolyl-5-phenoxymethyl-2-oxazolidone plus 1% Van 81 | 3.7 | 0.08 | 3.72 | 56.59 | 27.75 | 104 |
| 6 | 1% 3-phenyl-5-phenoxymethyl-2-oxazolidone plus 1% Van 81 | 2.6 | 0.05 | 2.55 | 41.74 | 27.74 | 50 |
| 7 | 1% 3,5-diphenyl-2-oxazolidone plus 1% Van 81 | 2.4 | 0.13 | 2.27 | 42.13 | 27.59 | 52 |
| 8 | 1% 3-phenyl-5-decyl-2-oxazolidone plus 1% Van 81 | 2.6 | 0.13 | 2.47 | | 27.35 | |

*The dioctyl diphenylamine mentioned in Col. 5, more precisely designated as 4,4'-dioctyldiphenylamine.

Other compounds which may be prepared as disclosed herein and which are useful as antioxidants in lubricants are 3-nitroso-5-ethylphenyl-5-octyl - 2 - oxazolidone, 3-phenyl-5-pentyl-5-nonyl - 2 - oxazolidone, 5 - tetradecyl oxazolidine, 5-octadecyl oxazolidone and 5-eicosyl oxazolidine.

I claim:
1. An organic composition comprising a major proportion of a lubricating oil or grease and an antioxidant amount of a 2-oxazolidone of the formula

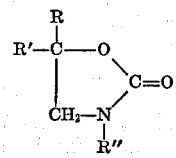

wherein R is selected from the group consisting of (1) alkyl of from 7 to about 20 carbon atoms, (2) members containing from 1 to about 18 carbon atoms selected from the group consisting of cycloalkyl, aryl, alkaryl and aralkyl and (3) members containing from about 2 to about 25 carbon atoms selected from the group consisting of alkoxyalkyl and aryloxyalkyl, R' is selected from the group consisting of (a) hydrogen, (b) members containing from 1 to about 18 carbon atoms selected from the group consisting of alkyl, cycloalkyl, aryl, alkaryl and aralkyl and (c) members containing from about 2 to about 25 carbon atoms selected from the group consisting of alkoxyalkyl and aryloxyalkyl and R'' is selected from the group consisting of R' and NO.

2. The composition of claim 1 wherein said lubricating oil is selected from the group consisting of synthetic ester lubricating oil, synthetic hydrocarbon polymer lubricating oil and silicone lubricating oil.

3. The composition of claim 2 wherein the said synthetic lubricating oil is an ester oil.

4. The composition of claim 3 wherein said ester is made from pentaerythritol and a monocarboxylic acid containing from about 5 to about 9 carbon atoms.

5. The composition of claim 1 wherein the 2-oxazolidone is 5-phenyl-5-methyl-2-oxazolidone.

6. The composition of claim 1 wherein the 2-oxazolidone is 5,5-diphenyl-2-oxazolidone.

7. The composition of claim 1 wherein the 2-oxazolidone is 3-p-tolyl-5-phenyl-2-oxazolidone.

8. The composition of claim 1 wherein the 2-oxazolidone is 3-p-tolyl-5-phenoxymethyl-2-oxazolidone.

9. The composition of claim 1 wherein the 2-oxazolidone is 3-nitroso-5,5-diphenyl-2-oxazolidone.

10. The composition of claim 1 wherein the 2-oxazolidone is 3-nitroso-5(2-ethylpentyl)-2-oxazolidone.

11. The composition of claim 1 having present therein a member selected from the group consisting of a phenyl naphthylamine and 4,4'-dioctyldiphenylamine.

12. The composition of claim 11 wherein said member is phenyl-α-naphthylamine.

13. The composition of claim 11 wherein said member is 4,4'-dioctyldiphenylamine.

References Cited
UNITED STATES PATENTS

| | | | |
|---|---|---|---|
| 3,146,203 | 8/1964 | Frew | 252—51.5 A |
| 3,152,141 | 10/1964 | Tousignant | 252—51.5 A |
| 3,282,840 | 11/1966 | Foster et al. | 252—50 |
| 3,372,120 | 3/1968 | Coleman | 252—51.5 A |

DANIEL E. WYMAN, Primary Examiner

W. J. SHINE, Assistant Examiner

U.S. Cl. X.R.

252—49.6, 515 R, 403